(No Model.)
W. MURCHLAND.
COW MILKER.
No. 473,770. Patented Apr. 26, 1892.
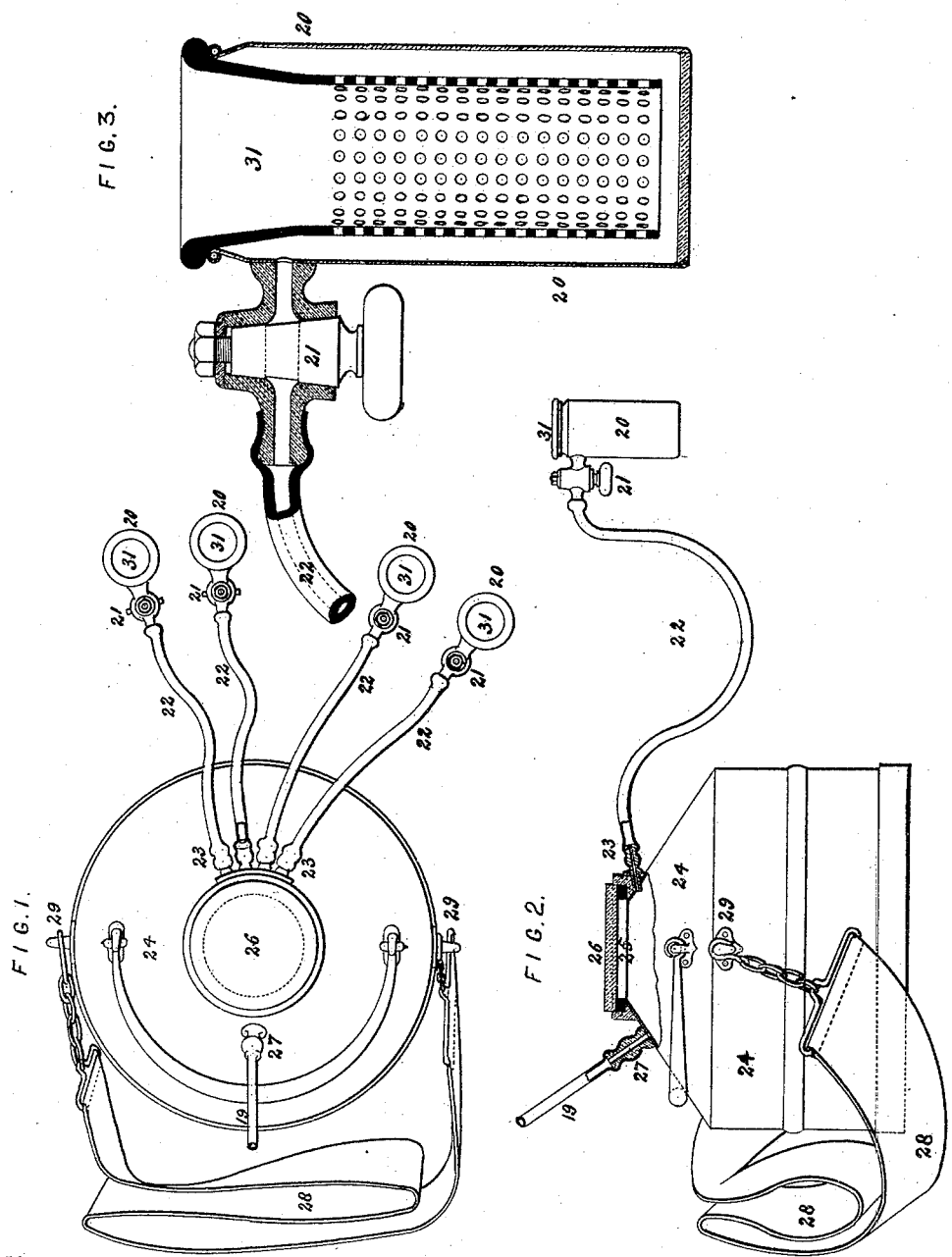
Witnesses
John Revell
George Baumann
Inventor
William Murchland
By his Attorneys
Howson and Howson

UNITED STATES PATENT OFFICE.

WILLIAM MURCHLAND, OF KILMARNOCK, SCOTLAND.

COW-MILKER.

SPECIFICATION forming part of Letters Patent No. 473,770, dated April 26, 1892.

Application filed February 3, 1891. Serial No. 380,052. (No model.) Patented in England September 27, 1889, No. 15,210, and in France July 9, 1890, No. 206,887.

*To all whom it may concern:*

Be it known that I, WILLIAM MURCHLAND, a subject of the Queen of Great Britain and Ireland, and a resident of Kilmarnock, in the county of Ayr, Scotland, have invented Improved Milking Apparatus, (for which I have obtained British Letters Patent, dated September 27, 1889, No. 15,210, and French patent, dated July 9, 1890, No. 206,887,) of which the following is a specification.

My said invention has for its object the construction of improved milking apparatus, comprising teat-cups connected to a receptacle for use in connection with suction apparatus of any suitable kind, but preferably of the kind described in the specification relative to a separate application for Letters Patent, the improved apparatus being such as to render the milking operation more natural, less rough, and more economical than the ordinary milking process.

On an accompanying sheet of drawings, Figure 1 is a plan of the milk-receptacle, connecting-tubes, and teat-cups. Fig. 2 is a vertical section, and Fig. 3 is an enlarged vertical section of one of the teat-cups.

In carrying out my invention the cups 20, provided for application to the cow's teats, are each fitted with a stop-cock 21, on the nozzle of which a short length of flexible tubing 22 can be secured. The other ends of the tubes 22 from the four teat-cups 20, for a cow, are secured on nozzles 23, fitted to the milk receptacle or collector 24. The inner ends of the nozzles 23 enter just below a circular aperture 25, formed in the top of the receptacle. The aperture 25 is closed by a glass disk 26, which rests on a rubber ring or washer held in the neck of the receptacle, and which when wetted is held close by atmospheric pressure on suction being applied to the receptacle. The receptacle 24 is fitted with a fifth nozzle 27 to receive a branch flexible pipe 19 to connect the receptacle to the suction apparatus. All necessity for attending to possible movements of a cow while being milked is avoided by providing the receptacle 24 with a strap 28 to be passed over the cow's back, this strap being attached to hooks 29, fixed on the receptacle 24. With the receptacle 24 suspended from the cow's back by means of the strap 28 if she moves she will carry it with her, and it will always be in the proper position. The attendant can at at any time see through the glass cover or disk 26 whether milk is passing into the receptacle 24, and can ascertain when a milking is completed.

Each teat-cup is made with an outer shell 20 of brass or other suitable metal, in the open end of which there is inserted a tube or sheath 31, preferably of rubber or other suitable elastic or compressible material. This tube 31 is slightly flared at its top or lip, the remaining portion, which extends to near the bottom of the outer shell 20, being perforated with a number of holes to diminish the extent of surface in contact with the teat and to allow of the teat being kept in a moist state; also, for the purpose last mentioned, the stop-cock 21 is placed near the upper end or lip of the cup, so that the milk in passing to it fills the space round the inner perforated tube 31.

I claim as my invention—

1. In a cow-milking apparatus adapted for the application of suction teat-cups, each consisting of an external impervious shell and an inner sheath perforated with a number of holes, substantially as described.

2. In a cow-milking apparatus adapted for the application of suction teat-cups, each consisting of an external impervious shell and an inner perforated sheath and having a stop-cock connection near the top or lip, substantially as herein set forth.

In testimony whereof I have signed my name to this specification in the presence of two subscribing witnesses.

WILLIAM MURCHLAND.

Witnesses:
 EDMUND HUNT,
 DAVID FERGUSON.